United States Patent
Andersen

(10) Patent No.: US 12,446,489 B2
(45) Date of Patent: Oct. 21, 2025

(54) RETURN PAN FOR AN AGRICULTURAL COMBINE

(71) Applicant: AGCO International GmbH, Neuhausen (CH)

(72) Inventor: Jonas Toft Andersen, Randers (DK)

(73) Assignee: AGCO International GmbH, Neuhausen (CH)

( * ) Notice: Subject to any disclaimer, the term of this patent is extended or adjusted under 35 U.S.C. 154(b) by 721 days.

(21) Appl. No.: 17/757,111

(22) PCT Filed: Dec. 1, 2020

(86) PCT No.: PCT/IB2020/061320
§ 371 (c)(1),
(2) Date: Jun. 9, 2022

(87) PCT Pub. No.: WO2021/116821
PCT Pub. Date: Jun. 17, 2021

(65) Prior Publication Data
US 2023/0015715 A1      Jan. 19, 2023

(30) Foreign Application Priority Data

Dec. 10, 2019   (GB) ..................... 1918100

(51) Int. Cl.
*A01D 41/127*   (2006.01)
*A01D 75/28*    (2006.01)
*A01F 12/52*    (2006.01)

(52) U.S. Cl.
CPC ........... *A01D 41/127* (2013.01); *A01D 75/28* (2013.01); *A01F 12/52* (2013.01)

(58) Field of Classification Search
CPC ............. A01D 75/28; A01D 75/252; A01D 41/127–41/1278; A01F 12/30; A01F 12/40–12/48; A01F 12/52
See application file for complete search history.

(56) References Cited

U.S. PATENT DOCUMENTS 2,189,706 A * 2/1940 Clipston .............. A01D 75/282
                                                  460/10
4,344,443 A * 8/1982 De Busscher ....... A01D 75/282
                                                  460/97

(Continued)

FOREIGN PATENT DOCUMENTS

| EP | 0323833 A1 * | 7/1989 | |
| EP | 2156727 A2 * | 2/2010 | ............. A01F 12/44 |
| WO | 2012/095239 A1 | 7/2012 | |

OTHER PUBLICATIONS

UK Intellectual Property Office, Search Report for UK Priority Application No. GB1918100.7, dated Jun. 9, 2020.

(Continued)

*Primary Examiner* — Joseph M Rocca
*Assistant Examiner* — Madeline I Runco

(57) ABSTRACT

A crop processing system in a combine harvester for directing grain and MOG on a return pan, having a crop processor arranged to thresh and separate grain from a crop stream, a return pan located below a rear portion of the crop processor to collect separated material falling from the crop processor and convey the material forward with respect to the normal forward direction of travel of the combine harvester, a plurality of paddles on the return pan, an inclinometer which measures the angle of the slope of the combine to the horizontal, and an ECU coupled to the paddles and able to command one or more actuators coupled to the paddles and adjust them to a preferred position according to the slope of the combine.

7 Claims, 5 Drawing Sheets

(56) References Cited

U.S. PATENT DOCUMENTS

| | | | | |
|---|---|---|---|---|
| 4,561,972 A * | 12/1985 | Alm | ............... | A01D 75/282 |
| | | | | 209/267 |
| 4,875,889 A | 10/1989 | Deere | | |
| 4,897,071 A | 1/1990 | Desnijder et al. | | |
| 5,791,986 A * | 8/1998 | Underwood | ............ | A01F 12/44 |
| | | | | 460/145 |
| 10,342,179 B2 * | 7/2019 | During | ................... | A01F 12/46 |
| 11,083,137 B2 * | 8/2021 | Vandike | ................. | A01F 12/46 |
| 12,161,066 B2 * | 12/2024 | Morrison | .............. | A01F 12/444 |
| 2002/0128054 A1 * | 9/2002 | Lauer | ................... | A01F 12/448 |
| | | | | 460/101 |
| 2017/0311547 A1 * | 11/2017 | Fuchs | ................. | A01F 12/446 |

OTHER PUBLICATIONS

European Patent Office, International Search Report for related International Application No. PCT/IB2020/061320, mail date Feb. 8, 2021.

* cited by examiner

RETURN PAN FOR AN AGRICULTURAL COMBINE

FIELD OF INVENTION

The present invention relates to agricultural harvesters such as combines, and, more particularly, to return pans.

BACKGROUND OF INVENTION

Self-propelled combine harvesters have been used by farmers since the early twentieth century to harvest grain crops from fields. Since then the basic architecture of the crop processing system employed has not changed significantly and is well known.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, normally in the form of a chain and slat elevator as shown, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30.

The feed beater 30 rotates on a transverse axis and comprises crop engaging vanes (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

Axial flow rotors 28 serve to thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 36 is typically a mix of grain and material other than grain (MOG) which may include chaff, tailings and some straw.

The twin rotor axial flow processor 26 shown is one example of known crop processors employed in combines today. Other known, and well established, types of crop processors include single rotor axial flow processors, tangential flow/straw walker (or conventional) processors, and hybrid processors.

The return pan 38 and stratification pan 40 together serve as a material conveyance system arranged to convey the separated crop material to a grain cleaning shoe designated generally at 42. The pans 38,40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge from where the material falls or cascades onto the stratification pan 40. The material on the stratification pan 40 is conveyed rearwardly to a rear discharge edge from where the material falls into the cleaning shoe 42.

The grain-MOG mixture conveyed by the stratification pan 40 "stratifies" over the course of conveyance wherein the heavier grain works its way into a bottom grain-rich layer and the lighter MOG works its way into a top MOG-rich layer. This pre-stratification effect upstream of the cleaning shoe has been found to be beneficial to the overall cleaning process and the capacity of the shoe. Moreover, extending the return pan 38 forwardly to present a significant overlap with the stratification pan 40 (even more so than shown) has been found to enhance the stratification of the total grain-MOG mix. The effects and advantages of pre-stratification of the grain-MOG mix are disclosed in WO-2012/095239, the contents of which are incorporated herein by reference.

The pre-stratified grain-MOG mix falls from the rear discharge edge into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at 54. A rear section of chaffer 50a is commonly independently adjustable and is configurable to allow un-threshed tailings to pass therethrough into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

The cleaning shoe 42 in a combine faces challenges when performing on a side hill due to insufficient material distribution where material tends to be distributed towards the lowest side of the combine when travelling on a side hill. The bottleneck for performing on side hill conditions is how the return pan distributes material to the stratification pan as much of the material essentially travels 'downhill' towards the lowest side of the combine.

SUMMARY OF INVENTION

It is an object of the invention to provide an improved return pan for use in a combine harvester which provides a better distribution of material to the stratification pan during performance of the combine on side hill conditions.

According to a first aspect of the present invention, there is provided a system for directing grain and MOG on a return pan, comprising:

a return pan;
a plurality of paddles disposed on the return pan;
at least one electronic control unit (ECU) coupled to the plurality of paddles; and
an inclinometer connected to the ECU and configured to measure the angle of the slope of the combine to the horizontal;
wherein the at least one ECU is configured to command at least one or more actuators coupled to the paddles to adjust the paddles to a preferred position according to the slope of the combine.

Whilst it has previously been proposed (in e.g. U.S. Pat. No. 4,875,889) to provide guide vanes on the stratification pan, the advantage of the present invention is delivered by the presence of paddles on the return pan which can be adjusted to guide the material 'uphill' on a return pan according to the slope of the combine to ensure a more even distribution of material to the stratification pan when the combine is travelling on a side hill.

In an embodiment, the plurality of paddles consists of at least two or more paddles, preferably at least two paddles.

The paddles are preferably made from plastic, or sheet metal or the like.

Preferably, the paddles are disposed laterally in a mutually spaced apart relation across the top surface of the return pan.

Preferably the paddles are pivotally connected to the return pan by being supported on pivot pins that extend through a floor of the return pan.

The inclinometer may generate a signal via a CAN BUS to the ECU which in turn operably moves the actuators to adjust the position of the paddles on the return pan.

The at least one ECU is preferably configured to steer the paddles in the same direction. In an embodiment, one ECU may operably move at least two or more actuators.

Suitably the at least one ECU comprises a digital microprocessor, RAM and ROM as well as driver circuits for generating signals to drive the at least one actuator. The ECU is preferably further configured to control the at least one actuator in response to the calculated slope of the combine measured by the inclinometer.

The one or more actuators may be a hydraulic or pneumatic cylinder or an electromechanical servo unit or any other suitable actuator readily known by or available to a skilled person. In an embodiment, the paddles are coupled to one or more servomotors.

In an embodiment, each of the paddles may be coupled to and driven by its own actuator.

In a further embodiment of the invention, the return pan may have a discharge edge having a central concave profile and substantially flat regions where the paddles are disposed on the return pan.

An advantage of this is that in the flat regions of the discharge edge, the paddles are able to more effectively direct the material 'uphill' to enable better material distribution to the stratification pan.

BRIEF DESCRIPTION OF THE DRAWINGS

The invention will now be described, by way of example only, with reference to the accompanying drawings, in which.

SPECIFIC DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine 10 and indicated by arrow F. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference of the general direction of crop flow along the material conveyance systems described.

Figure 1:
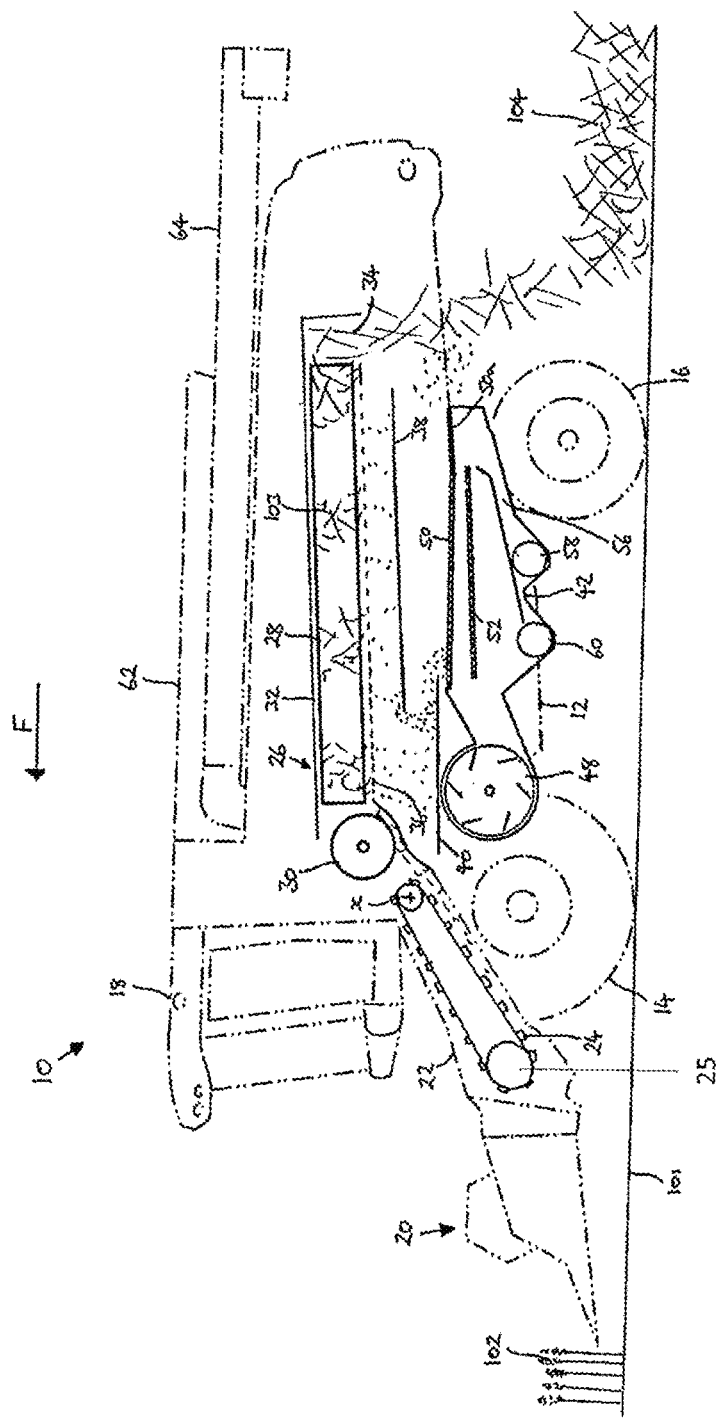
FIG. 1 shows a schematic side view of a known combine harvester comprising a known crop processing architecture.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feeder house 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feeder house 22. An elevator 24, normally in the form of a chain and slat elevator as shown, is housed within the feeder house 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging vanes (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

Axial flow rotors 28 serve to thresh the crop stream in a front region, separate the grain therefrom in a rear region, and eject the straw residue via a straw discharge chute 34 provided below a rear portion of the rotors 20, the straw falling either directly onto the ground in a windrow 104 as shown, or via a cutting machine such as a straw chopper.

The cutting machine is formed with an inlet for reception of threshed but unchopped cutting material usually straw emanating from such crops as wheat, barley, rye and oats and with an outlet for the chopped material.

Figure 2A:
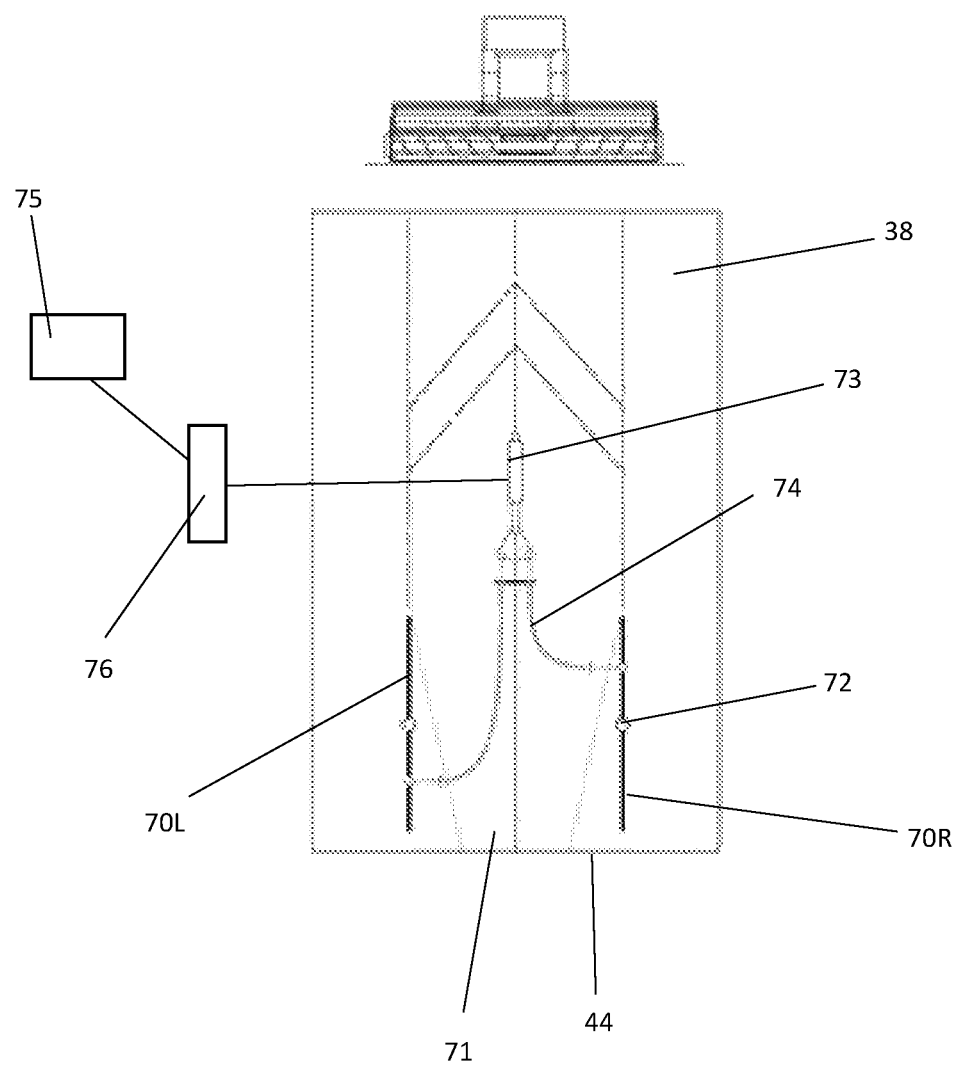
FIG. 2a shows a plan view of the arrangement of two paddles on the return pan with the two paddles resulting in a distribution appropriate for when the combine is travelling on flat ground.
Figure 2B:
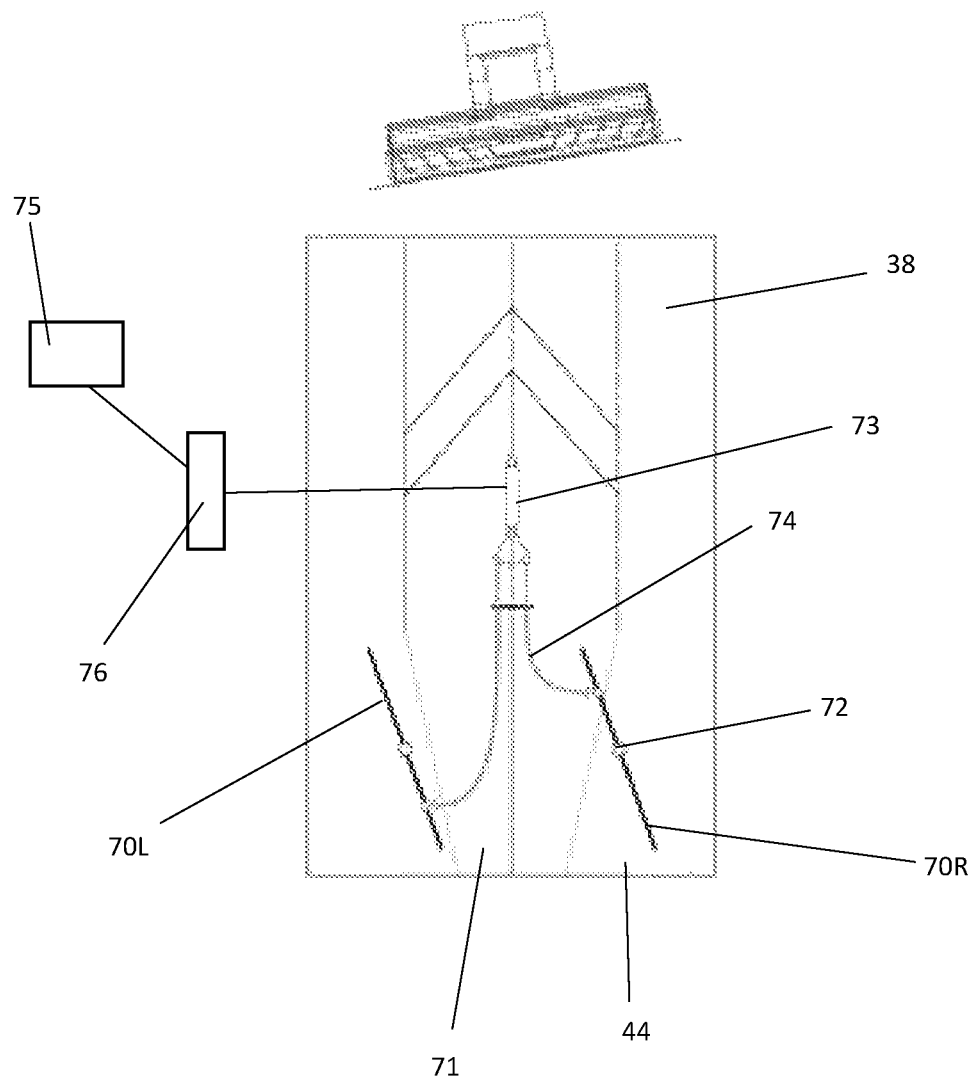
FIG. 2b shows a plan view of the arrangement of two paddles on the return pan with the two paddles resulting in a spreading distribution towards the left side of the combine when on a side hill.
Figure 3:
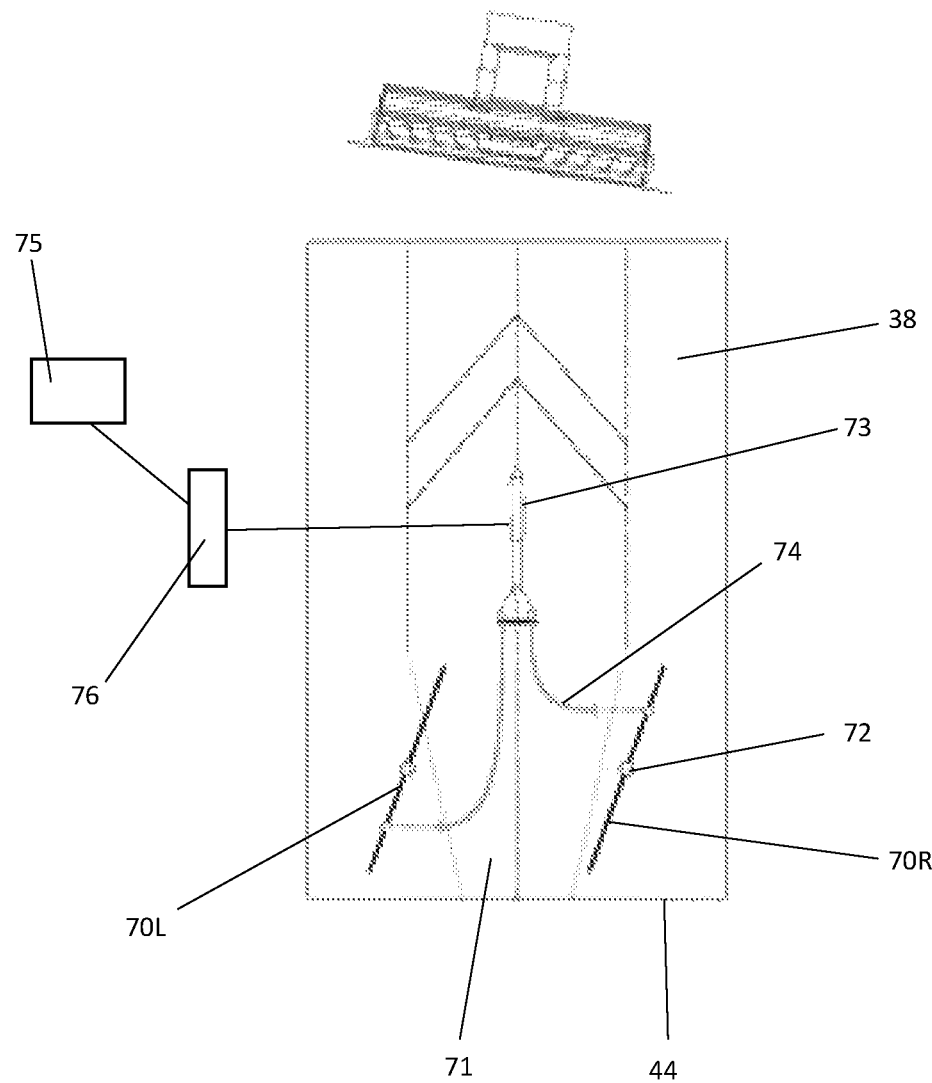
FIG. 3 shows a plan view of the arrangement of two paddles on the return pan with the two paddles resulting in a spreading distribution towards the right side of the combine when on a side hill.
Figure 4:
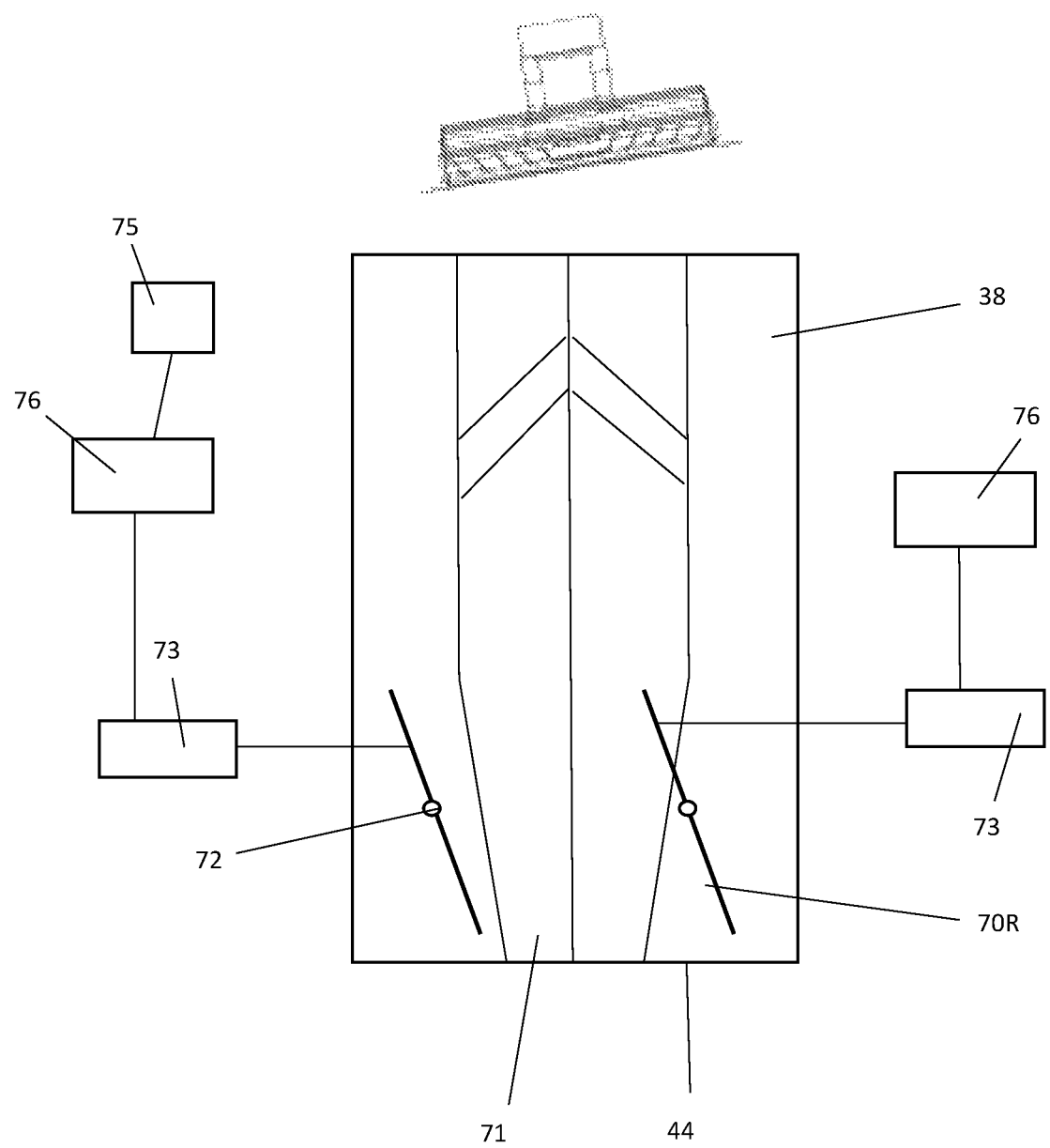
FIG. 4 shows a plan view of two actuators coupled to the paddles on the return pan with the two paddles resulting in a spreading distribution towards the right side of the combine when on a side hill.

FIGS. 2 to 4 show plan views of the arrangement of the paddles on the return pan according to an embodiment of the invention.

As shown in FIGS. 2 to 4, the return pan 38 has a front discharge edge 44 which is substantially flat at each end and a central zone 71 having a concave profile. The paddles 70L and 70R are disposed laterally in a mutually spaced apart relation across the top surface of the return pan.

The paddles are pivotally connected to the return pan by being supported on pivot pins 72 which are coupled to the paddles.

As shown in FIGS. 2 and 3, the paddles are coupled to at least one servomotor 73 which is connected to the return pan. The servomotor operably moves the paddles through respective cables 74 which are connected to the paddles.

When the combine is travelling on a relatively flat ground, the paddles are positioned in a parallel orientation aligned fore and aft as shown in FIG. 2a.

When the combine is on a side hill as shown in FIG. 2b, the inclinometer 75 measures the angle of the slope of the combine, suitably the lateral angle of the combine, to the horizontal and generates a signal via a CAN BUS connection to the ECU 76. The ECU is configured to operably move the servometer 73 which moves the cables 74 which are connected to the paddles 70. The paddles are moved to the preferred position with the ends of the paddles closest to the front discharge edge 44 being angled towards the left side of the return pan and direct the material uphill to allow for better distribution onto the stratification pan when the combine is on a side hill as shown in FIG. 2b.

As shown in FIG. 3, when the combine is traveling in an opposite direction across a side hill, the inclinometer 75 measures the (lateral) angle of the slope of the combine to the horizontal and generates a signal via CAN BUS to the ECU 76. The ECU is configured to operably move the servometer 73 which operably moves the cables 74 which are connected to the paddles 70. The paddles are moved towards the preferred position with the ends of the paddles closest to the front discharge edge 44 being angled to the right side of the return pan and direct the material uphill to allow for better distribution onto the stratification pan when the combine is on a side hill as shown in FIG. 3.

Through the movement of the paddles during side hill travel of the combine, the material is directed in an uphill manner to prevent material from being distributed by gravity towards the lowest side of the combine when on a side hill. This enables a better distribution of the material onto the stratification pan thereby increasing the efficiency of the combine when traveling on side hills.

In an alternative arrangement, as shown in FIG. 4, the combine is travelling on a side hill. In this arrangement of the return pan 38, each paddle 70L, 70R is controlled by a separate actuator 73. The inclinometer 75 measures the angle of the slope of the combine and generates a signal via a CAN BUS to the ECU 76. The inclinometer is shown in FIG. 4 to communicate with one of the ECU's but can also communicate with the other ECU 76 shown on the right hand side. The ECU is configured to operably move the actuators which operably moves the paddles 70L and 70R to the preferred position. The paddles are moved towards the right side of the return pan and direct the material uphill to allow for better distribution onto the stratification pan when the combine is on a side hill as shown in FIG. 4. In FIG. 4, a separate ECU is shown, each of which controls one of the actuators. In a further embodiment, there may be only one ECU which is able to operably move two actuators which operably move paddles 70L and 70R.

In summary there is disclosed a system for directing grain and MOG on a return pan, comprising a return pan, a plurality of paddles disposed on the return pan, at least one ECU coupled to the plurality of paddles; and an inclinometer which measures the angle of the slope of the combine to the horizontal; wherein the at least one ECU is able to command at least one or more actuators coupled to the paddles to adjust them to a preferred position according to the slope of the combine.

Clearly the skilled person will recognise that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A crop processing system in a combine harvester for directing grain and MOG on a return pan, comprising:
   a crop processor arranged to thresh and separate grain from a crop stream;
   a return pan disposed below a rear portion of the crop processor and arranged to collect separated material falling from the crop processor and convey the separated material forwardly with respect to a normal forward direction of travel of the combine harvester, wherein the return pan has a discharge edge having a central concave profile and substantially flat regions where the paddles are disposed on the return pan;
   a plurality of paddles disposed on the return pan;
   at least one electronic control unit (ECU) coupled to the plurality of paddles; and
   an inclinometer connected to the ECU and configured to measure an angle of a slope of the combine to the horizontal,
   wherein the at least one ECU is configured to command at least one actuator coupled to the paddles to adjust the paddles to a preferred position according to the slope of the combine.

2. The crop processing system of claim 1, wherein the plurality of paddles comprises at least two paddles.

3. The crop processing system of claim 1, wherein the paddles are disposed laterally in a mutually spaced apart relation across a top surface of the return pan.

4. The crop processing system of claim 1, wherein the paddles are pivotally connected to the return pan by being supported on pivot pins that extend through a floor of the return pan.

5. The crop processing system of claim 1, wherein the at least one actuator is a hydraulic or pneumatic cylinder.

6. The crop processing system of claim 1, wherein each of the paddles is exclusively coupled to and driven by a dedicated actuator of the at least one actuators.

7. The crop processing system according to claim 1, wherein the at least one actuator is an electromechanical servo unit.

* * * * *